United States Patent [19]
Wakabayashi et al.

[11] Patent Number: 5,495,836
[45] Date of Patent: Mar. 5, 1996

[54] THROTTLE-VALVE CONTROL APPARATUS FOR SPARK-IGNITION TWO-CYCLE ENGINES

[75] Inventors: Shinichi Wakabayashi; Shoji Masuda; Masahiko Abe; Yoshiyasu Uchida; Yoichi Ishibashi, all of Saitama, Japan

[73] Assignee: Honda Giken Kogyo Kabushiki Kaisha, Tokyo, Japan

[21] Appl. No.: 348,896

[22] Filed: Nov. 25, 1994

[30] Foreign Application Priority Data

Nov. 27, 1993 [JP] Japan ................... 5-321037

[51] Int. Cl.$^6$ ................ F02D 9/10; F02D 41/08
[52] U.S. Cl. ................ 123/339.13; 123/339.23; 123/400
[58] Field of Search ............ 123/339.13, 339.23, 123/337, 400, 403, 73 A

[56] References Cited

U.S. PATENT DOCUMENTS

| | | | |
|---|---|---|---|
| 2,190,738 | 2/1940 | Schweiss | 123/339.13 |
| 4,180,029 | 12/1979 | Onishi | 123/73 A |
| 4,200,596 | 4/1980 | Iiyama et al. | 123/339.13 |
| 4,213,431 | 7/1980 | Onishi | 123/73 R |
| 4,445,468 | 5/1984 | Onishi et al. | 123/73 C |
| 4,566,415 | 1/1986 | Iwai et al. | 123/400 |
| 4,932,371 | 6/1990 | Albertson et al. | 123/403 |
| 4,940,031 | 7/1990 | Mann | 123/339.13 |
| 5,273,016 | 12/1993 | Gillespie et al. | 123/403 |

FOREIGN PATENT DOCUMENTS

| | | |
|---|---|---|
| 0636776 | 6/1994 | European Pat. Off. . |
| 2376296 | 7/1978 | France . |
| 2515260 | 4/1983 | France . |
| 56-38766 | 9/1981 | Japan . |
| 56-54336 | 12/1981 | Japan . |
| 62-23523 | 1/1987 | Japan . |
| 3-33426 | 2/1991 | Japan . |

OTHER PUBLICATIONS

Patent Abstracts Of Japan, vol. 15, No. 416 (M–1172) Oct. 23, 1991.

*Primary Examiner*—Willis R. Wolfe

[57] ABSTRACT

A throttle-valve control apparatus is provided for allowing switching from an ordinary-combustion state to an AR-combustion state or vice versa to take place with ease in an AR-combustible spark-ignition two-cycle engine wherein, at least during a light-load operation, a compression-start pressure is properly controlled in order to let fresh air in a combustion chamber self-ignite so as to undergo active thermal atmosphere combustion. A throttle drum is linked to a throttle grip through a wire. The throttle drum is also linked to a throttle valve through a linking mechanism. An arm forms a single body with the throttle drum. An adjustment screw is fixed at the end of the arm. A cam is supported at such a location that the cam can be brought into contact with the adjustment screw. A pulley forms a single body with the cam. A cable which is wound around the pulley is linked to a throttle-valve servo motor. In ordinary combustion ignited by spark ignition, the cam is erected, preventing the throttle opening rate $\theta_{th}$ of the throttle valve from decreasing to a value smaller than, typically, 17%.

15 Claims, 14 Drawing Sheets

THROTTLE-VALVE CONTROL APPARATUS FOR SPARK-IGNITION TWO-CYCLE ENGINES

BACKGROUND OF THE INVENTION

1. Field of the Invention

The present invention relates to -a throttle-valve control apparatus for allowing switching from an ordinary-combustion state to an AR-combustion state or vice versa to take place with ease in an AR-combustible spark-ignition two-cycle engine wherein, at least during a light-load operation, a compression-start pressure is properly controlled in order to let a fresh air/fuel mixture in a combustion chamber self-ignite so as to undergo active thermal atmosphere combustion.

2. Description of the Prior Art

In the conventional vehicle spark-ignition two-cycle engine mounted on a motor bicycle or the like, an exhaust port and a scavenging .port are created on the inner surface of a cylinder. The exhaust and scavenging ports are opened and closed by a piston. A fresh air/fuel mixture precompressed in a crank chamber is supplied into the cylinder through the scavenging port and, at the same time, burned gas is exhausted from the cylinder through the exhaust port. The fresh air/fuel mixture compressed in the cylinder is then ignited by spark plugs. Even during an idle operation, it is necessary to supply a fresh air/fuel mixture of a certain amount to the cylinder. Thus, a throttle valve on an air intake passage needs to be opened to a certain degree, in actuality, to a position greater than about 10% of the complete opening of the throttle valve.

On top of that, such a conventional spark-ignition two-cycle engine has another problem in that, if the exhaust port is enlarged for raising the output and efficiency in the region of high-speed and heavy-load operations to values greater than already high standards, the amount of unburned hydrocarbon in the region of light-load operation due to blow-by of a fresh air/fuel mixture and combustion instability increases, resulting in inefficient fuel consumption.

In order to solve the above problems, the applicants of the present invention designed an AR combustible spark-ignition two-cycle engine that can perform activated heat atmosphere combustion in the region of light-load operations through self-ignition with timing desirable for engine operations by properly narrowing the exhaust port or the exhaust passage in accordance with the current operational state so as to allow fresh air in the combustion chamber to be activated by thermal energy contained in burned gas of the previous cycle. The patent was applied for with Patent Application No. H5-187488.

The combustion wherein the ignition timing preferable for operation of an engine is controlled positively to cause activated heat atmosphere combustion to take place in this manner is hereinafter referred to as AR combustion. A detailed description of AR combustion can be found in publication "A Trial for Stabilizing Combustion in Two-Stroke Engines at Part Throttle Operation", by Yoichi Ishibashi and Yuji Tsushima, which is herein incorporated by reference.

An attempt to apply the throttle-valve control mechanism of the conventional spark-ignition two-cycle engine to the AR-combustible spark-ignition two-cycle engine, that can perform AR combustion as described above, in the region of light-load operations was found unsuitable to reduce the opening of the throttle valve to an amount proper for AR combustion without applying some operational force to an operation member of the throttle valve.

If the opening of the throttle valve is set at an amount proper to the AR combustion at a position with no operational force applied to the operation member of the throttle valve, the throttle valve must be sustained at a required amount of opening with some operational force applied to the operation member of the throttle valve at an idle-operation state resulting from ordinary spark ignition. In other words, an idle operation cannot be carried out with the operation member of the throttle valve released.

SUMMARY AND OBJECTS OF THE INVENTION

Addressing the problems described above, the present invention relates to an improved throttle-valve control apparatus for an AR-combustible spark-ignition two-cycle engine. Specifically, the present invention provides an AR-combustible spark-ignition two-cycle engine wherein, at least in a region of light-load operations, a compression-start pressure is properly controlled in order to let a fresh air/fuel mixture in a combustion chamber self-ignite at an ignition time desirable for engine operations so as to undergo active thermal atmosphere combustion. The throttle-valve control apparatus comprises a throttle valve fixed on an air intake passage, a throttle-valve operation member for manually operating said throttle valve, a throttle-valve opening means for opening said throttle valve in accordance with amounts of manual operation of said throttle-valve operation member and a throttle-valve opening control means for driving said throttle-valve opening means. The throttle-valve-opening control means determines whether a current state is a state for operating said AR-combustible spark-ignition two-cycle engine by ordinary combustion resulting from spark ignition or a state for operating said AR-combustible spark-ignition two-cycle engine by AR-combustion resulting from self-ignition at a controlled ignition time. The throttle-valve-opening control means then makes lower-limit value of openings of said throttle valve resulting from manual operations of said throttle-valve operation member small in comparison with a lower-limit value of those in a state for operating said AR-combustible spark-ignition two-cycle engine by ordinary combustion resulting from spark ignition if said current state was found out to be a state for operating said AR-combustible spark-ignition two-cycle engine by AR combustion resulting from self-ignition at a controlled ignition time.

In the throttle-valve control apparatus provided by the present invention with the configuration described above, information on the rotational speed of the AR-combustible spark-ignition two-cycle engine, the current position of the throttle-valve operation member, the operational direction of the throttle-valve operation member, the disengagement position of the clutch, the current position of the transmission and other information is obtained in order to determine whether a current state is a state for operating the AR-combustible spark-ignition two-cycle engine by ordinary combustion resulting from spark ignition or a state for operating the AR-combustible spark-ignition two-cycle engine by AR combustion resulting from self-ignition at a controlled ignition time. If the current state is found to be a state for operating the AR-combustible spark-ignition two-cycle engine by ordinary combustion resulting from spark ignition, the lower-limit value of openings of the throttle valve resulting from manual operations of the throttle-valve operation member is set at a large value so as to allow an idle-operation state to be sustained without applying any operational force to the throttle-valve operation member. If the current state is found to be a state for operating the AR-combustible spark-ignition two-cycle engine by AR combustion resulting from self-ignition at a controlled ignition time, on the other hand, the lower-limit value of openings of the throttle valve resulting from manual operations of the throttle-valve operation member is set at a small value so as to give a reduced opening of the throttle valve which allows an AR-combustion operation to be carried out in regions including that of light loads.

By virtue of the present invention, it is therefore no longer necessary for the driver to determine whether the driver should carry out an ordinary-combustion operation or an AR-combustion operation. Instead, by merely operating the throttle-valve operation member, the AR-combustible spark-ignition two-cycle engine can be controlled and operated at an optimum operation state very easily.

In addition, the improved throttle-valve control apparatus provides an AR-combustible spark-ignition two-cycle engine wherein, at least in a region of light-load operations, a compression-start pressure is properly controlled in order to let a fresh air/fuel mixture in a combustion chamber self-ignite at an ignition time desirable for engine operations so as to undergo active thermal atmosphere combustion. The throttle-valve control apparatus comprises a throttle valve fixed on an air intake passage, a throttle-valve operation member for manually operating said throttle valve, a throttle-valve-closing-direction limiting means for selectively limiting a closing direction of said throttle valve so as to prevent said throttle valve from being closed to an opening smaller than a predetermined amount of opening and a throttle-valve-opening-limit control means for controlling said throttle-valve-closing-direction limiting means. The throttle-valve-opening-limit control means determines whether a current state is a state for operating said AR-combustible spark-ignition two-cycle engine by ordinary combustion resulting from spark ignition or a state for operating said AR-combustible spark-ignition two-cycle engine by AR-combustion resulting from self-ignition at a controlled ignition time. The throttle-valve-opening-switching control means then either actuates said throttle-valve-closing-direction limiting means so as to prevent said throttle valve from being closed to an opening smaller than said predetermined amount of opening if said current state was found to be a state for operating said AR-combustible spark-ignition two-cycle engine by ordinary combustion resulting from spark ignition or places the throttle-valve-closing-direction limiting means in a non-operative state so as to allow said throttle valve to be closed to an opening smaller than said predetermined amount of opening if said current state was found to be a state for operating said AR-combustible spark-ignition two-cycle engine by AR-combustion resulting from self-ignition at a controlled ignition time.

In such a configuration, it is thus not necessary to create a dedicated idling air intake passage. Accordingly, the structure becomes simpler, resulting in a lower cost. On top of that, at switching times from the ordinary combustion to the AR combustion or vice versa, the amount of mixed air and the air-to-fuel ratio can each be held at an almost constant value. As a result, there is no risk of irregular combustion or accidental fire in which case a stable operating state can be sustained.

Furthermore, the present invention provides an AR-combustible spark-ignition two-cycle engine wherein, at least in a region of light-load operations, a compression-start pressure is properly controlled in order to let fresh air in a combustion chamber self-ignite at an ignition time desirable for engine operations so as to undergo active thermal atmosphere combustion, with a throttle-valve control apparatus characterized in that including a throttle valve operation member, which is at least almost completely closable, fixed on an air intake passage, a throttle valve fixed on said air intake passage, a throttle-valve operation member for manually operating said throttle valve, a by-pass air intake passage for by-passing a segment of said air intake passage between upstream and downstream sides of said air intake passage by making a long way around said throttle valve, an opening/closing valve for opening and closing said by-pass air intake passage, and an opening/closing control means for controlling said opening/closing valve. The opening/closing control means determines whether a current state is a state for operating said AR-combustible spark-ignition two-cycle engine by ordinary combustion resulting from spark ignition or a state for operating said AR-combustible spark-ignition two-cycle engine by AR combustion resulting from self-ignition at a controlled ignition time. The opening/closing control means then either opens the opening/closing valve if the current state was found to be a state for operating the AR-combustible spark-ignition two-cycle engine by ordinary combustion resulting from spark ignition or closes the said opening/closing valve if the current state was found to be a state for operating said AR-combustible spark-ignition two-cycle engine by AR combustion resulting from self-ignition at a controlled ignition time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
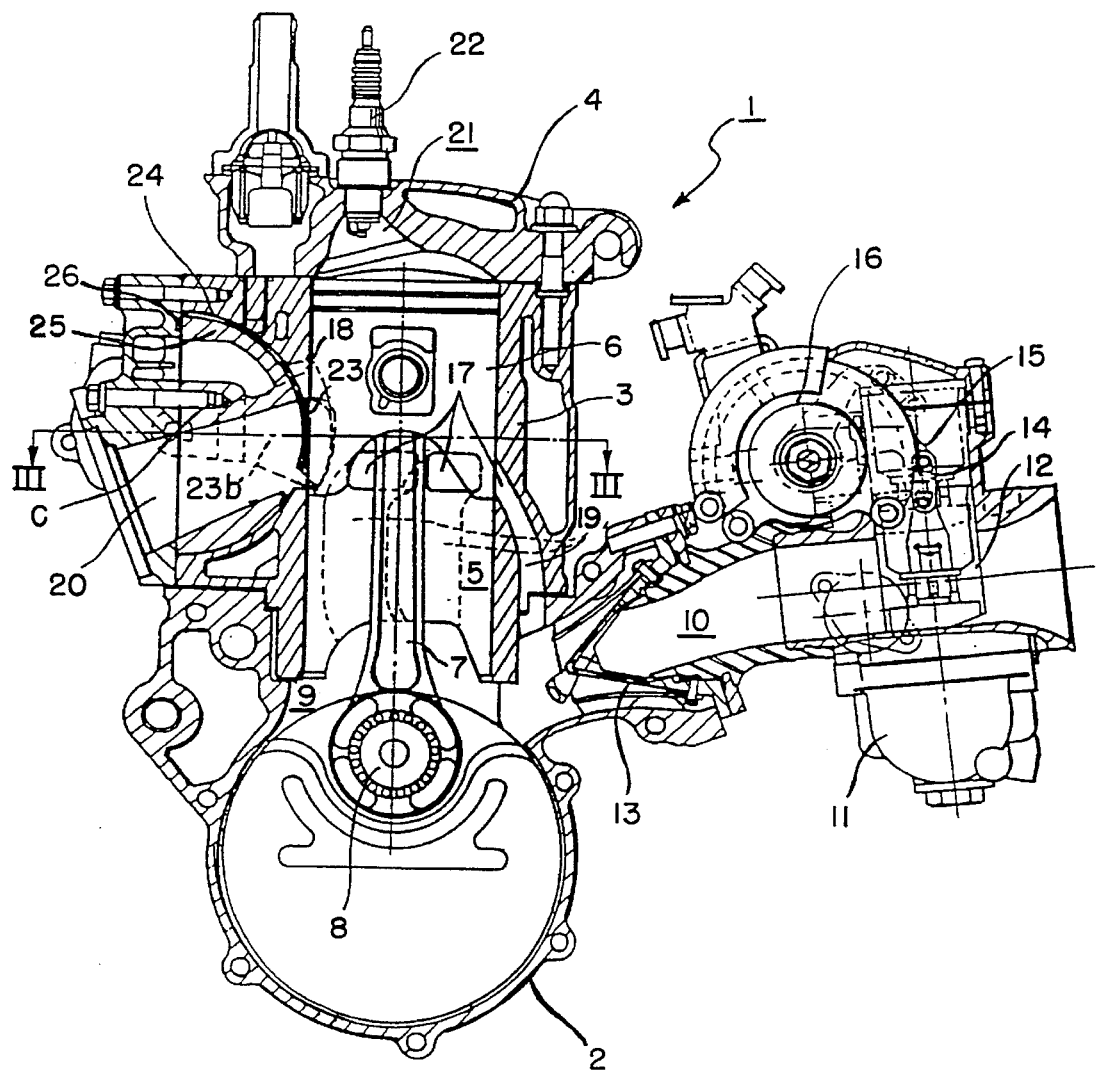
FIG. 1 is a diagram showing a vertical side cross section of the cylinder of an AR-combustible spark-ignition two-cycle engine equipped with a throttle-valve control apparatus according to the principles of the present invention.

The present invention will become apparent from the following detailed description of preferred embodiments with reference to accompanying diagrams shown in FIGS. 1 to 5.

An AR-combustible spark-ignition two-cycle engine 1 employing a throttle-valve control apparatus provided by the present invention is mounted on a motor bicycle which is not shown in the figures. In the AR-combustible spark-ignition two-cycle engine 1, a cylinder block 3 is installed on a crank case 2 and a cylinder head 4 is mounted on the cylinder block 3. The crank case 2, the cylinder block 3 and the cylinder head 4 are mutually joined to each other to form a single body.

A cylinder 5 is created in the cylinder block 3. A piston 6 fits into the inside of the cylinder 5 in such a way that the piston 6 can move freely up and down along the axis of the cylinder 5. The piston 6 and a crank 8 are linked to each other by a connecting rod 7. The up-down movement of the piston 6 rotates the crank 8 and the rotation of the crank 8 moves the piston 6 up and down.

Furthermore, an air intake passage 10 is connected to a crank chamber 9 in the crank case 2. A carburetor 11 and a reed valve 13 are installed on the air intake passage 10 in series. A piston-type throttle valve 12 of the carburetor 11 is linked to a throttle drum 16 through a rod 14 and a lever 15. The throttle drum 16 is further linked to a throttle grip through a wire which is not shown in the figures. When the throttle grip is turned in one direction, the throttle valve 12 moves upward, increasing its opening.

As described above, the air intake passage 10 is connected to the crank chamber 9 in the crank case 2. A scavenging port 17 and an exhaust port 18 are disposed on the inner surface of the cylinder 5. The scavenging port 17 is connected to the crank chamber 9 through a scavenging passage 19 whereas the exhaust port 18 is connected to an exhaust passage 20.

A combustion chamber 21, at the upper part of the cylinder 5 is offset a little on the side of the exhaust port 18. A spark plug 22 is installed in an upper part of the combustion chamber 21. Fresh air mixed with fuel supplied from the carburetor 11 is drawn into the crank chamber 9 during an upward stroke of the piston 6 due to a negative pressure developed in the crank chamber 9 through the reed valve 13. The fresh air/fuel mixture is compressed during a downward stroke of the piston 6. As the piston 6 moves downward in a downward stroke to a position lower than the scavenging port 17, the scavenging port 17 is opened, allowing the compressed fresh air to be supplied to the combustion chamber 21. The introduction of the compressed fresh air/fuel mixture into the combustion chamber 21 causes some of the burned gas to be exhausted from the combustion chamber 21 to the exhaust passage 20 through the exhaust port 18. In a next upward stroke of the piston 6, the scavenging port 17 is closed, followed by the closure of the exhaust port 18. With both the scavenging and exhaust ports 17 and 18 closed, the upward movement of the piston 6 compresses the fresh air/fuel mixture in the combustion chamber 21. As the piston 6 approaches an upper dead center, ignition by the spark plug 22 or self-ignition by thermal energy contained in the residual gas of the previous cycle takes place.

Figure 2:
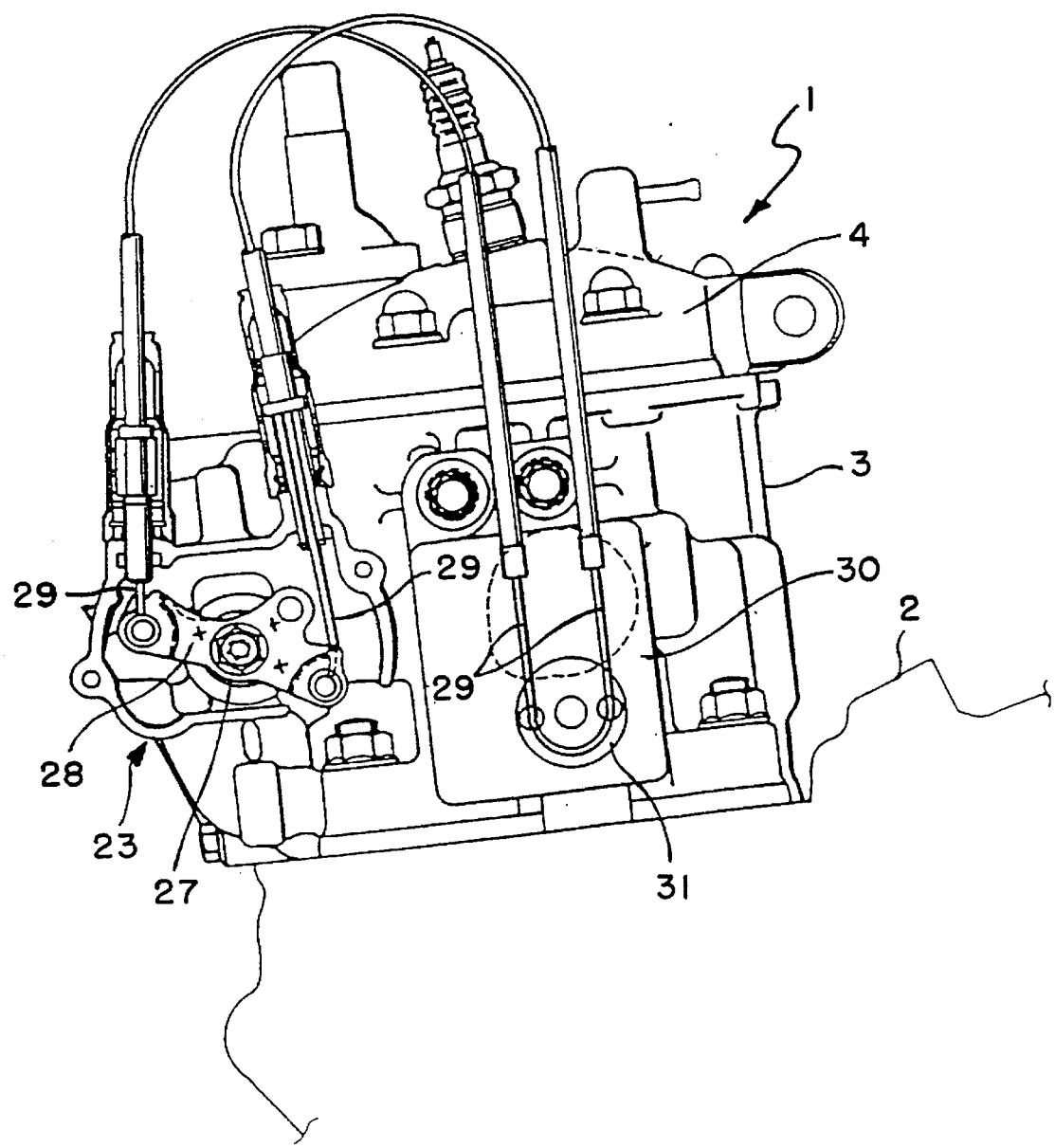
FIG. 2 is a diagram showing a side view of the same side of the AR-combustible spark-ignition two-cycle engine shown in FIG. 1.
Figure 3:
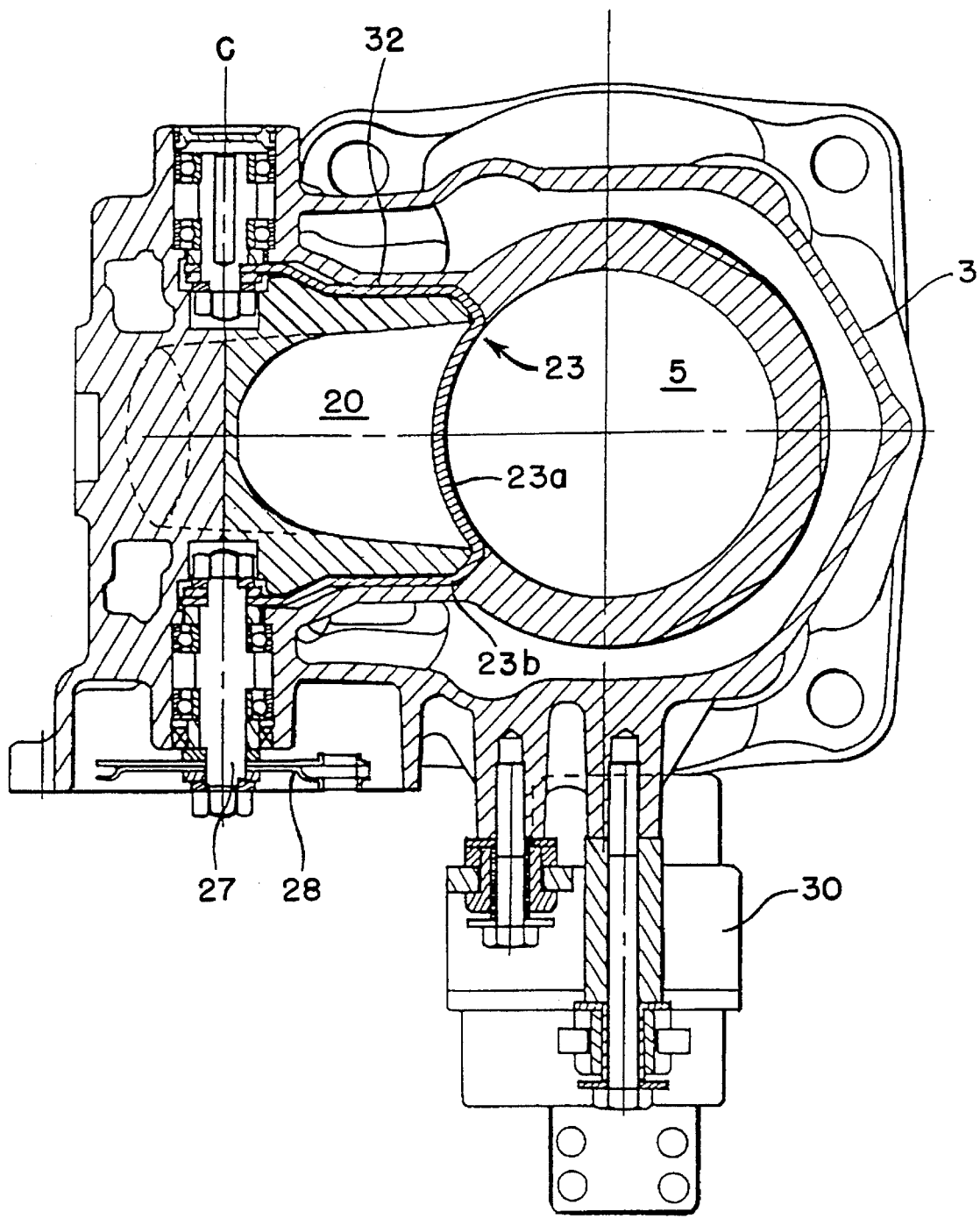
FIG. 3 is a diagram showing a horizontal cross section along a line III—III shown in FIG. 1.

In addition, an exhaust-control valve 23 is installed in close proximity to the exhaust port 18. To be more specific, the exhaust-control valve 23 is fixed in a gap 26 having about the same width as the exhaust-control valve 23. The gap 26 is located between a dent 24 resembling a cross-sectional arc on the cylinder block 3 and an exhaust-passage member 25 created with about the same cross section as the dent 24. The exhaust-control valve 23 is supported in the gap 26 in such a way that the exhaust-control valve 23 can slide freely up and down with a center line (c) taken as the center of movement. A driving axis 27 forms a single body with the exhaust-control valve 23. A driving lever 28 shown in FIG. 2 is mounted on the driving axis 27 also to form a single body. The driving lever 28 is linked with a pulley 31 of an exhaust-control servo motor 30 through a driving cable 29. Driven by the exhaust-control servo motor 30, the exhaust-control valve 23 slides up and down, allowing a required exhaust opening rate $\theta_e$ to be set at a value in the range of 0% to 100%.

A side arm unit 23b of the exhaust control valve 23 is fixed into a gap 32 at a location external to the exhaust passage 20. The side arm unit 23b excluding an arc-formed unit 23a of the exhaust-control valve 23 for closing the exhaust port 18 is designed so as to have no adverse effect on the flow of the exhausted gas.

Figure 4:
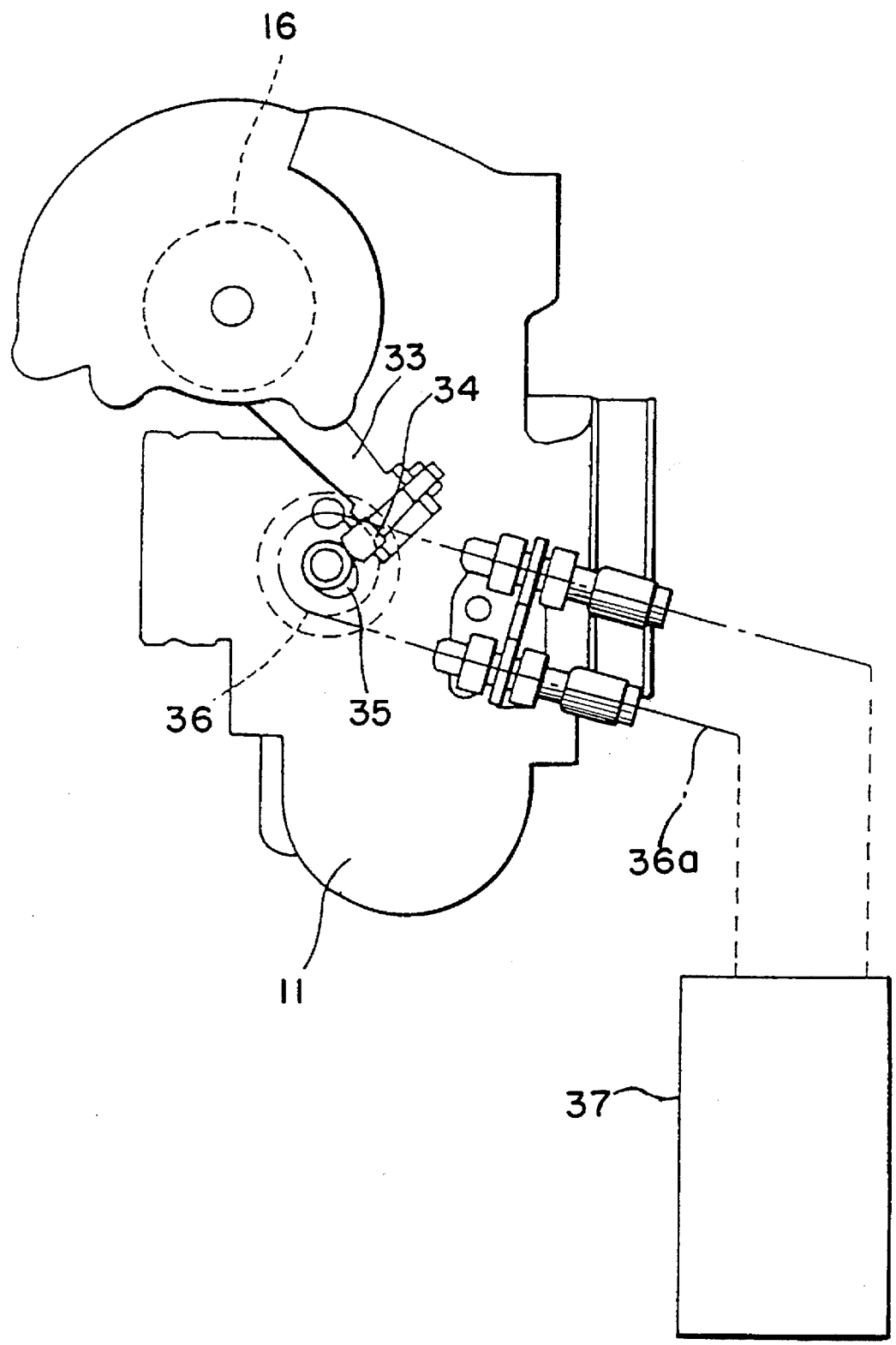
FIG. 4 is a diagram showing a side view of an embodiment implementing a throttle-valve control apparatus in accordance with the present invention.

As shown in FIG. 4, which is drawn to illustrate the same side as FIG. 1, an arm 33 forms a single body with the throttle drum 16. An adjustment screw 34 is fixed at the end of the arm 33. A cam 35 is supported at such a location that the cam 35 can be brought into contact with the adjustment screw 34. A pulley 36 forms a single body with the cam 35. A cable 36a which is wound around the pulley 36 is linked to a throttle-valve servo motor 37. In ordinary combustion ignited by spark ignition, the cam 35 is erected, preventing the throttle opening rate $\theta_{th}$ of the throttle valve 12 from decreasing to a value smaller than, typically, 17%.

Figure 5:
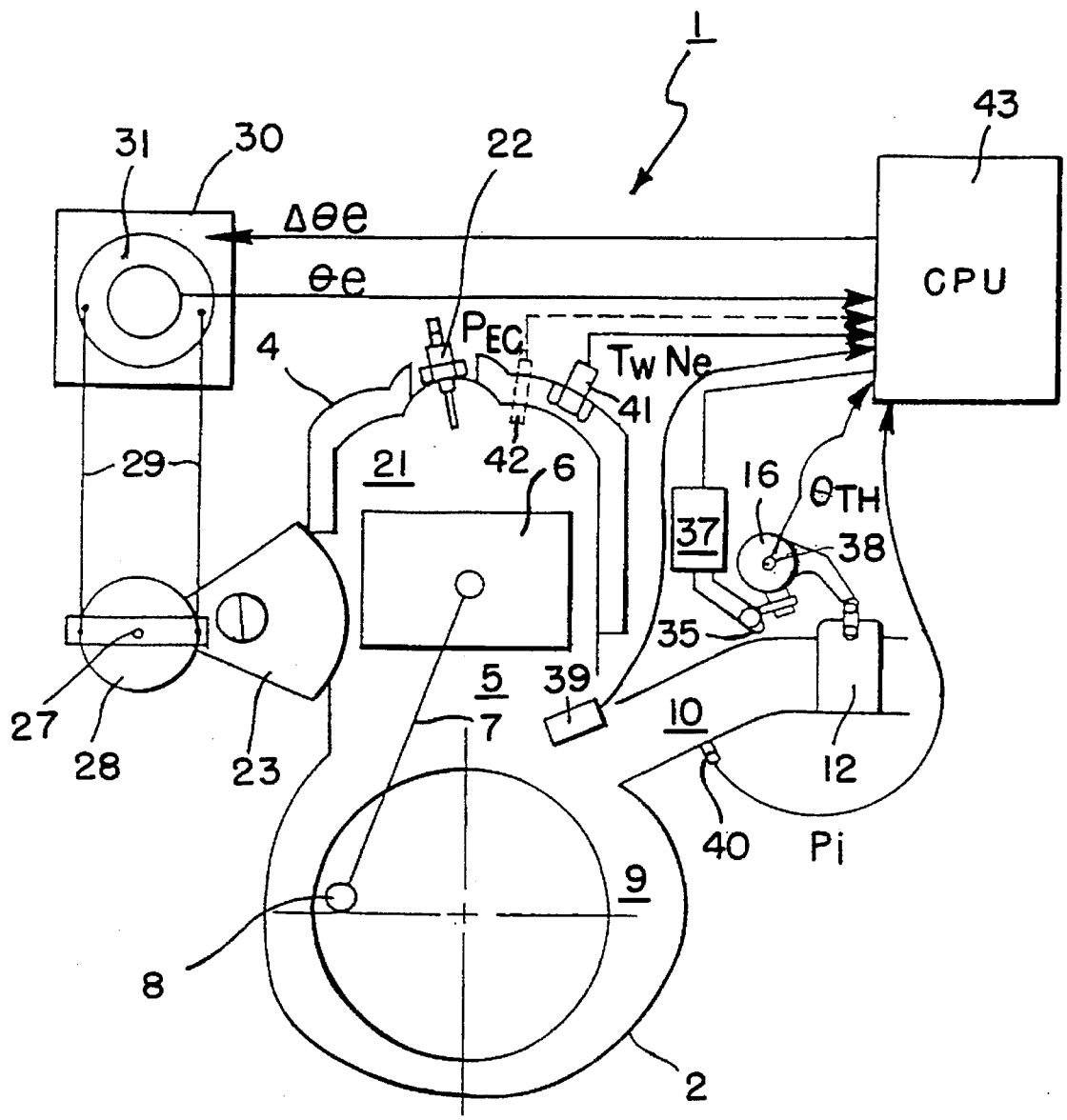
FIG. 5 is a simplified diagram showing a control system for driving a throttle valve and an exhaust control valve of an AR-combustible spark-ignition two-cycle engine provided by the present invention.

The parts of an AR-combustible spark-ignition two-cycle engine 1 according to the present invention are shown diagrammatically in FIG. 5. The throttle opening rate $\theta_{th}$ of the manually operated throttle valve 12 is detected by a throttle-opening sensor 38 which comprises, among other components, a potentiometer. A signal output by the throttle-opening sensor 38 is supplied to a CPU 43.

In addition, the CPU 43 also receives an engine rotational speed signal Ne detected by an engine-rotational-speed sensor 39, an intake manifold pressure signal $P_i$ detected by an intake manifold pressure sensor 40, a cooling-water temperature signal $T_W$ detected by a water temperature gauge 41, an indicator maximum pressure generation time, an ignition time or a compression-start pressure signal $P_{EC}$ detected by an indicator or an optical sensor 42, clutch disengagement information and a transmission displacement position.

After receiving these input signals, the CPU 43 identifies the state of the AR-combustible spark-ignition two-cycle engine 1 and transmits a variety of control signals. In an operating region to carry out AR combustion, the throttle-valve control servo motor 37 is operated to rotate the cam 35 so that the throttle opening rate $\theta_{th}$ of the throttle valve 12 can be reduced to a value smaller than an idle throttle opening rate $\theta_{th}$ through manual operations, departing from a state in which ordinary combustion is ignited by spark ignition. In addition, the cam 35 is erected in order to prevent the throttle opening rate $\theta_{th}$ of the throttle valve 12 from decreasing to a value smaller than the idle throttle opening rate $\theta_{th}$.

In addition, in the operating region to carry out AR combustion, the CPU 43 issues a driving signal $\Delta\theta_e$ to the exhaust-control servo motor 30. Upon receiving the driving signal $\Delta\theta_e$ the exhaust-control servo motor 30 operates in accordance with a control map shown in FIG. 6 which is used for determining the exhaust-opening rate $\theta_e$ from a given engine rotational speed Ne and a given throttle opening rate $\theta_{th}$.

Figure 6:
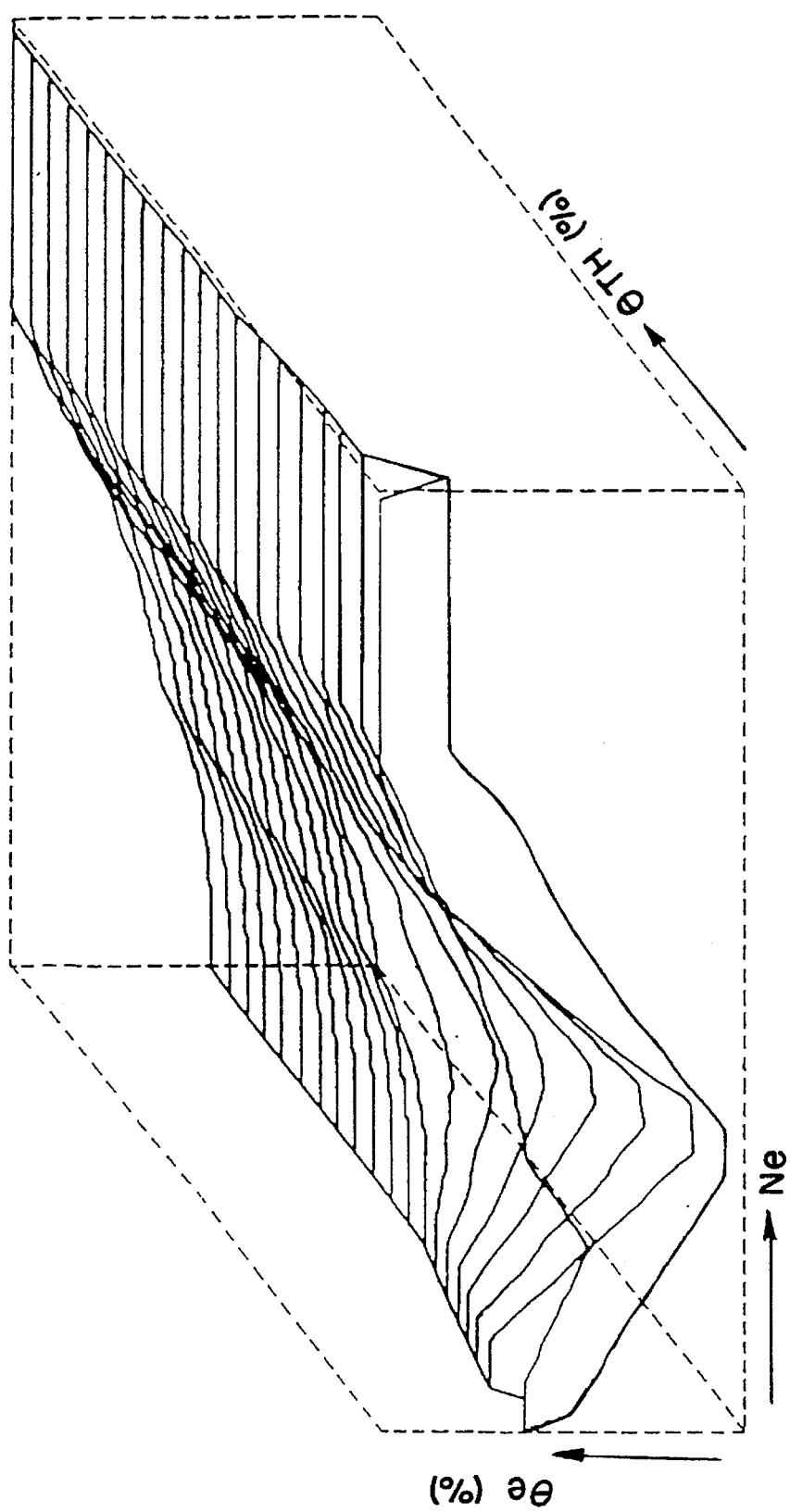
FIG. 6 is a diagram showing a control map.

Values of the exhaust-opening rate $\theta_e$ shown in the control map of FIG. 6 are values allowing ignition of air/fuel mixture in the cylinder 5 to take place with timing most appropriate for operations of the AR-combustible spark-ignition two-cycle engine 1.

The CPU 43 indicates whether the current operation of the AR-combustible spark-ignition two-cycle engine is an AR-combustion or an ordinary-combustion operation. The operation is determined to be an AR-combustion operation if the clutch is engaged, the displacement position of the transmission is other than the neutral position, the throttle opening rate $\theta_{th}$ of the throttle valve 12 is smaller than a predetermined value, the rate of change per unit time of the throttle-valve opening rate $\theta_{th}$ is also smaller than a certain value and conditions for a light-load operating region appropriate to carry out AR-combustion operations are satisfied. In this case, an AR-combustion operation is performed. In other cases, an operation based on ordinary combustion resulting from spark ignition is carried out.

Figure 7:
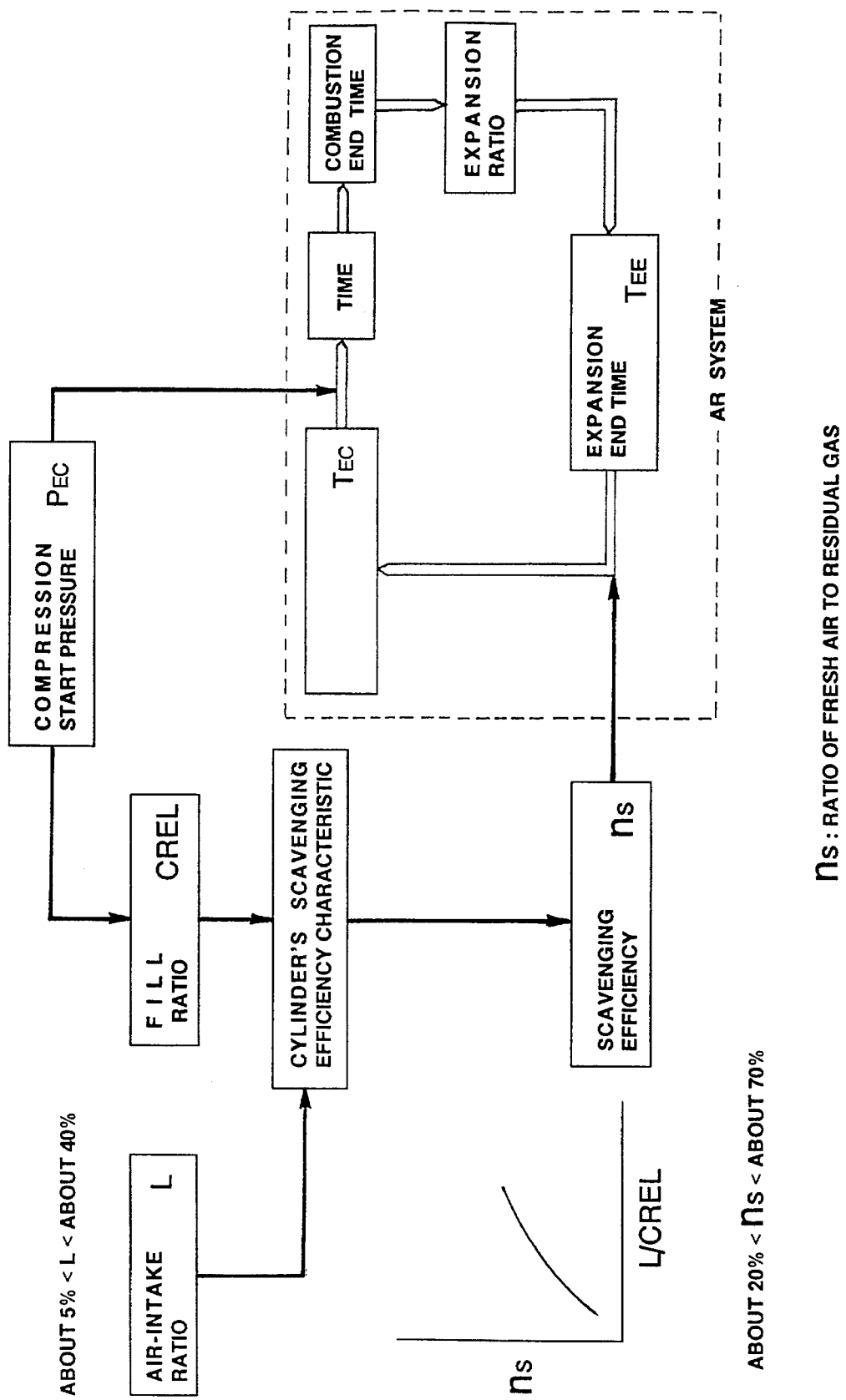
FIG. 7 is an explanatory diagram showing the principle of operation of an AR-combustible spark-ignition two-cycle engine to which the present invention is applied.

Requirements that allow AR combustion to be carried out, that is, requirements that allow combustion to be performed by artificially controlling the self-ignition timing in an AR-combustible spark-ignition two-cycle engine are described as shown in FIG. 7.

If a compression-start pressure $P_{EC}$ of the air inside the cylinder with the exhaust port 18 closed and a compression-start temperature $T_{EC}$ of the air inside the cylinder at that time are known, an ignition time is determined univocally. At such an ignition time, the temperature of the air in the cylinder rises due to adiabatic compression taking place inside the cylinder, reaching a temperature value for the fuel to undergo self-ignition. A combustion-end time lagging behind the ignition time by a period required for combustion of a predetermined amount of fuel inside the cylinder is also determined as well. By expressing the combustion-end time in terms of crank-angle degrees, an expansion ratio and an expansion-end temperature $T_{EE}$ which affects the compression-start temperature $T_{EC}$ are also determined. The expansion ratio is defined to be a ratio of a combustion-end volume to an exhaust-start volume.

A fill ratio Crel for the compression-start pressure $P_{EC}$ is defined as a ratio of Vg to Vh (Crel=Vg/Vh) where Vg =Vf+Vr. Vg is the total amount of gas inside the cylinder at the compression-start time. Vf is the amount of gas in the intake fresh air/fuel mixture. Vr is the amount of residual burned gas inside the cylinder at the compression-start time, and Vh is a stroke volume of the cylinder. An air-intake ratio L is defined as a ratio of Vs to Vh (L=Vs/Vh) where Vs is the volume of intake gas. A scavenging efficiency $\eta_s$ is defined as a ratio of Vf to Vg ($\eta_s$=Vf/Vg). A scavenging-efficiency characteristic is a curve representing a relation between the scavenging efficiency $\eta_s$ and a ratio of L to Crel (L/Crel). For a proper value of L in the range of about 5% to about 40%, the scavenging efficiency is found from the scavenging-efficiency characteristic to have a value in the range of about 20% to about 70%. In this case, the residual gas, part of the combustion gas which has attained the expansion-end temperature $T_{EE}$ described above, is mixed with fresh air at a proper mix ratio to result in mixed gas with a temperature equal to the compression-start temperature $T_{EC}$, establishing an AR system. In this embodiment, by varying the opening of the throttle control valve 23, the scavenging efficiency $\eta_s$ can be modified.

In the AR system, when the compression-start temperature $T_{EC}$ decreases due to an external disturbance, the ignition time as well as the combustion-end time are delayed. In this state, an expansion-end time is approached with the combustion gas inside the cylinder not sufficiently expanded, causing the expansion-end temperature $T_{EE}$ to rise. Accordingly, the compression-start temperature $T_{EC}$ also increases as well. As a result, a stable self-control system can be sustained.

Since the embodiments shown in FIGS. 1 to 5 each have the configuration described above, at the start time, the cam 35 is in an erected state, mechanically locking the throttle valve 12. In this state, the opening of throttle valve 12 is prevented from decreasing to a value smaller than the idle throttle opening rate $\theta_{thi}$. In addition, it is obvious from the control map shown in FIG. 6 that the exhaust control valve 23 is set at a value greater than the exhaust opening rate $\theta_e$ in a rotational-speed region close to an idle rotational speed. As a result, fresh air is sufficiently supplied into the combustion chamber 21, resulting in a good start characteristic.

The state in which the opening of throttle valve 12 is prevented from being squeezed to a value smaller than the idle throttle opening rate $\theta_{thi}$ is also established during abrupt acceleration, abrupt deceleration and an operation at a high rotational speed in addition to the start time.

Figure 8:
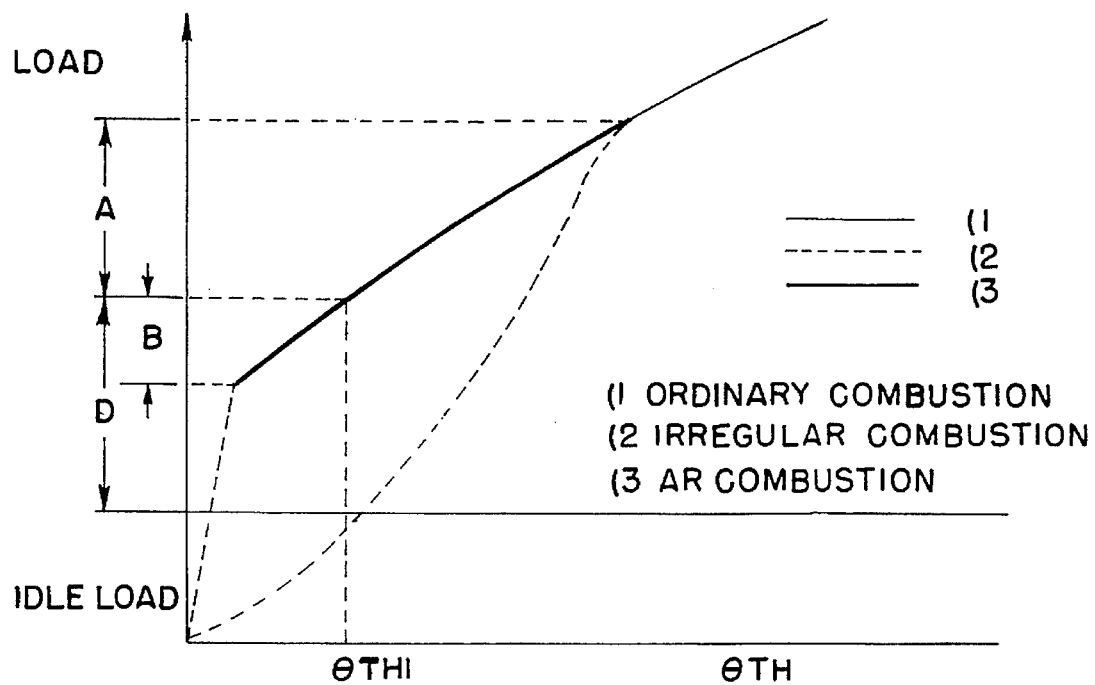
FIG. 8 is a diagram showing characteristics of combustion states representing relations between the throttle-valve opening rate $\theta_{th}$ and the load of an AR-combustible spark-ignition two-cycle engine.
Figure 9:
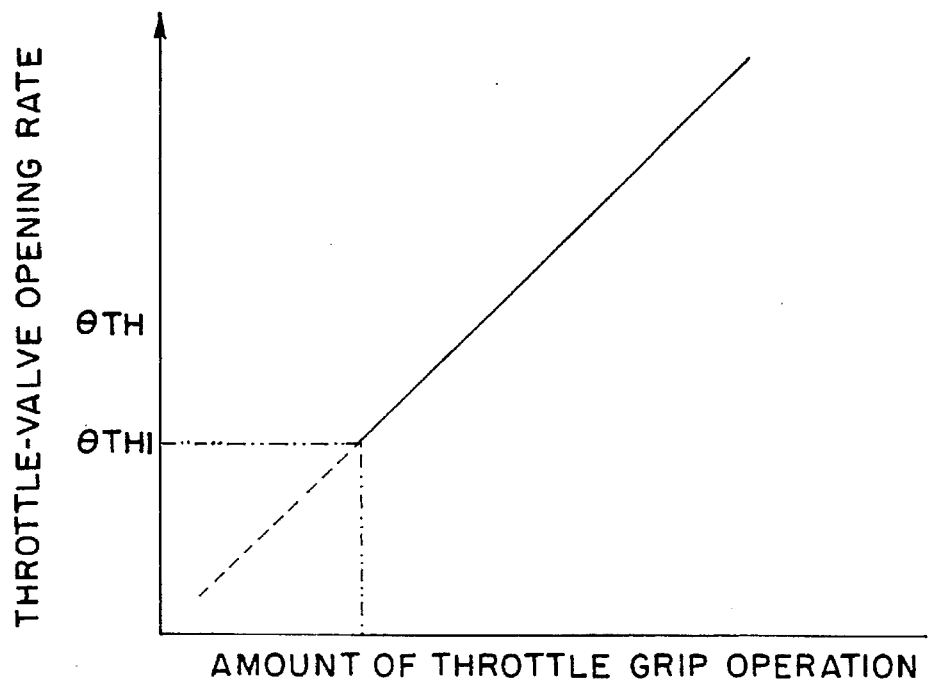
FIG. 9 is a characteristic diagram showing a relation between the amount of throttle grip operation and the throttle-valve opening rate $\theta_{th}$ for the embodiments.

When the AR-combustible spark-ignition two-cycle engine 1 is operated in a low-speed and light-load state with neither abrupt acceleration nor abrupt deceleration and the motor bicycle is running at a low speed or, in other words, when the clutch is in an engaged state, the transmission is operated at a transmission position other than the neutral one. When the AR-combustible spark-ignition two-cycle engine 1 is operating at a rotational speed lower than a predetermined value, the throttle-valve control servo motor 37 is driven by a control signal issued by the CPU 43 to rotate the cam 35 from an erected state to a leveled state. Thus, the throttle valve 12 can be closed to an opening smaller than the idle throttle opening rate $\theta_{thi}$ as indicated by a dashed line shown in FIG. 9. It is therefore possible to set the throttle valve 12 at the throttle-valve opening rate $\theta_{th}$ required in an AR-combustion operation. As a result, it is possible to carry out an AR-combustion operation not only in a load region A but also in a load region B, allowing the motor bicycle to run with a load D even if the throttle-valve opening rate $\theta_{th}$ is set at the idle throttle-valve opening rate $\theta_{thi}$ as shown in FIG. 8.

Since the air intake passage 10 is a single passage, the amount of mixed gas and the air-to-fuel ratio can be controlled properly even at a switching time from an ordinary-combustion operation to an AR-combustion operation or vice versa. As a result, irregular combustion and accidental fire can be prevented from taking place at such a switching time.

Figure 10:
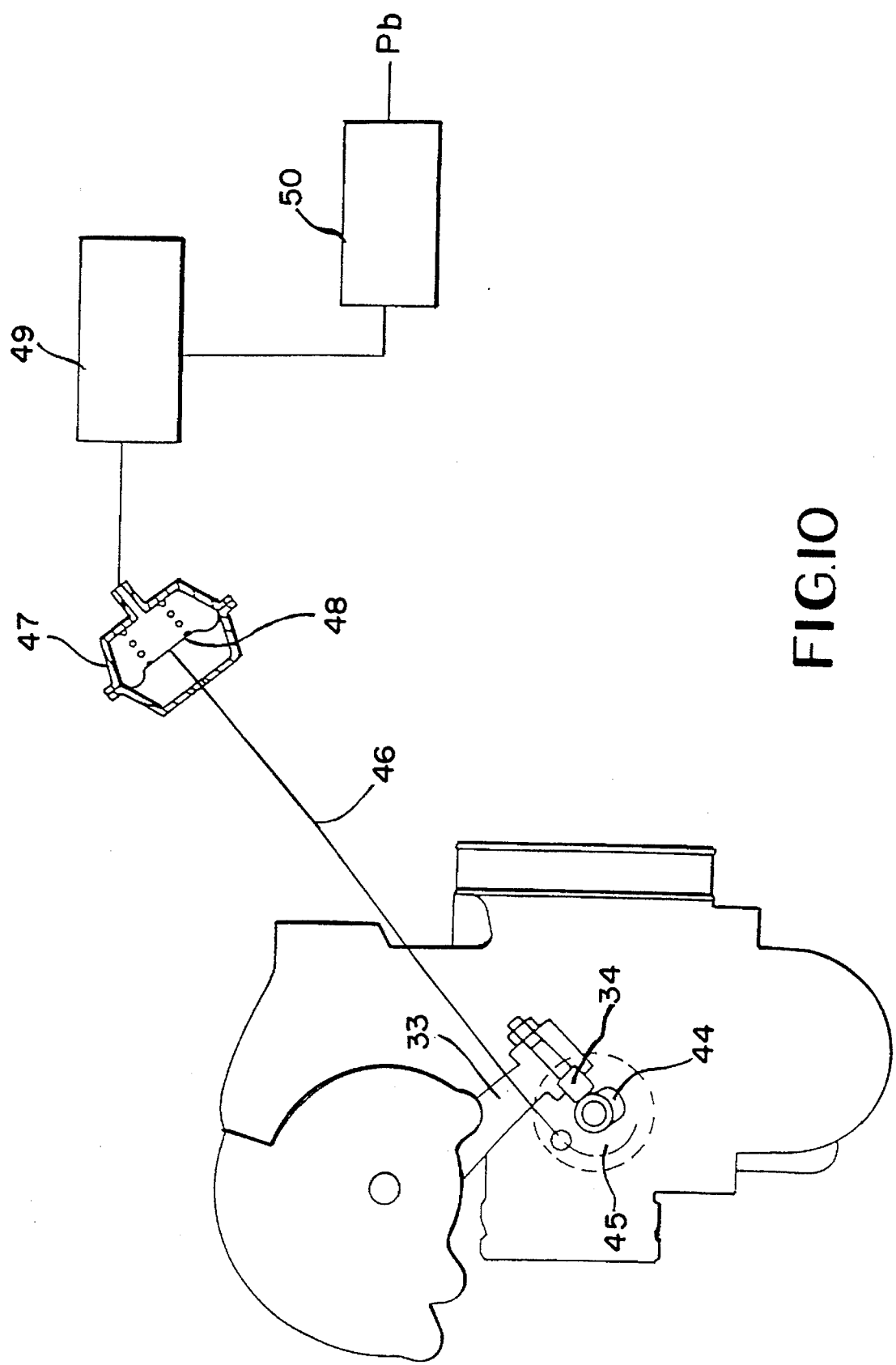
FIG. 10 is a view showing a side of another embodiment.

In the case of the embodiments shown in FIGS. 1 to 5, the lower limit value of the throttle-valve opening rate $\theta_{th}$ of the throttle valve 12 can be varied continuously by properly rotating the cam 35. As described earlier, the cam 35 is rotated by operating the throttle-valve control servo motor 37. An alternative is shown in FIG. 10. As shown in FIG. 10, a protrusion 44 is used in place of the cam 35. A rotating body 45 forming a single body with the protrusion 44 is linked to a movable piece 48 of a diaphragm 47 through a rod 46. The diaphragm 47 is connected to an accumulator 50 through a solenoid 49. By opening and closing the solenoid 49, the protrusion 44 can be protruded or leveled in an off and on manner.

As another alternative, an inclined cut facing downward slantingly can be created on the side surface of the lower portion of a piston-type throttle valve. The longer the downward distance from the lower portion of the piston-type throttle valve, gradually the bigger the depth of the cut as measured from the side surface. With the cut having such a shape, the protrusion length toward the cut can be adjusted continuously by the rotation of a servo motor. As a result, the same effects as those of the embodiments shown in FIGS. 1 to 5 can be obtained.

Figure 11:
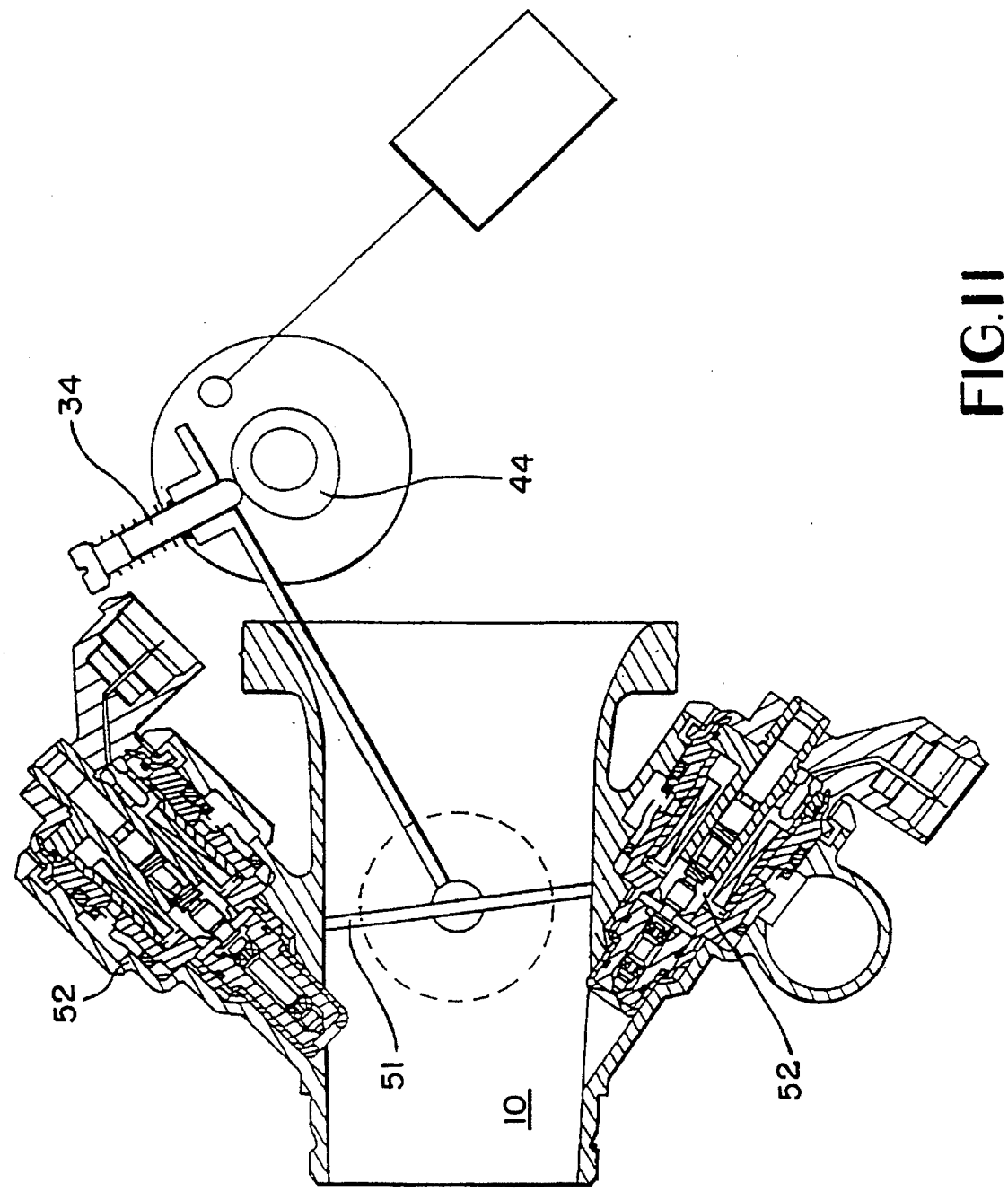
FIG. 11 is a view showing a side of still another embodiment.

In the case of the embodiments described above, fuel is supplied to the AR-combustible spark-ignition two-cycle engine 1 by a carburetor 11. It should be noted that the present invention can also be applied to an AR-combustible spark-ignition two-cycle engine of the fuel-jet type equipped with a butterfly-type throttle-valve 51 and a fuel-jet valve 52 as shown in FIG. 11.

Figure 12:
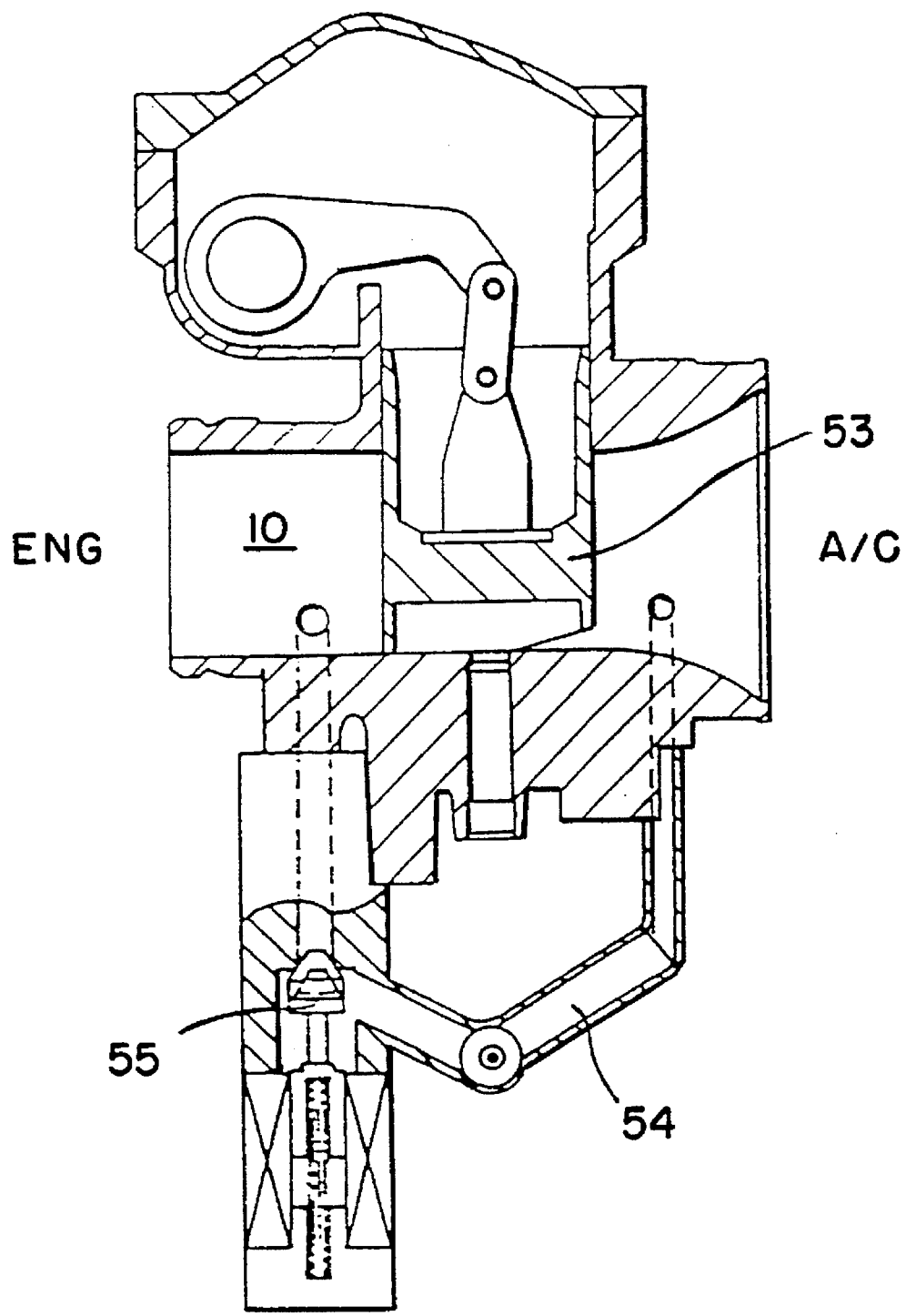
FIG. 12 is a view showing a side of still another embodiment provided by the present invention.
Figure 13:
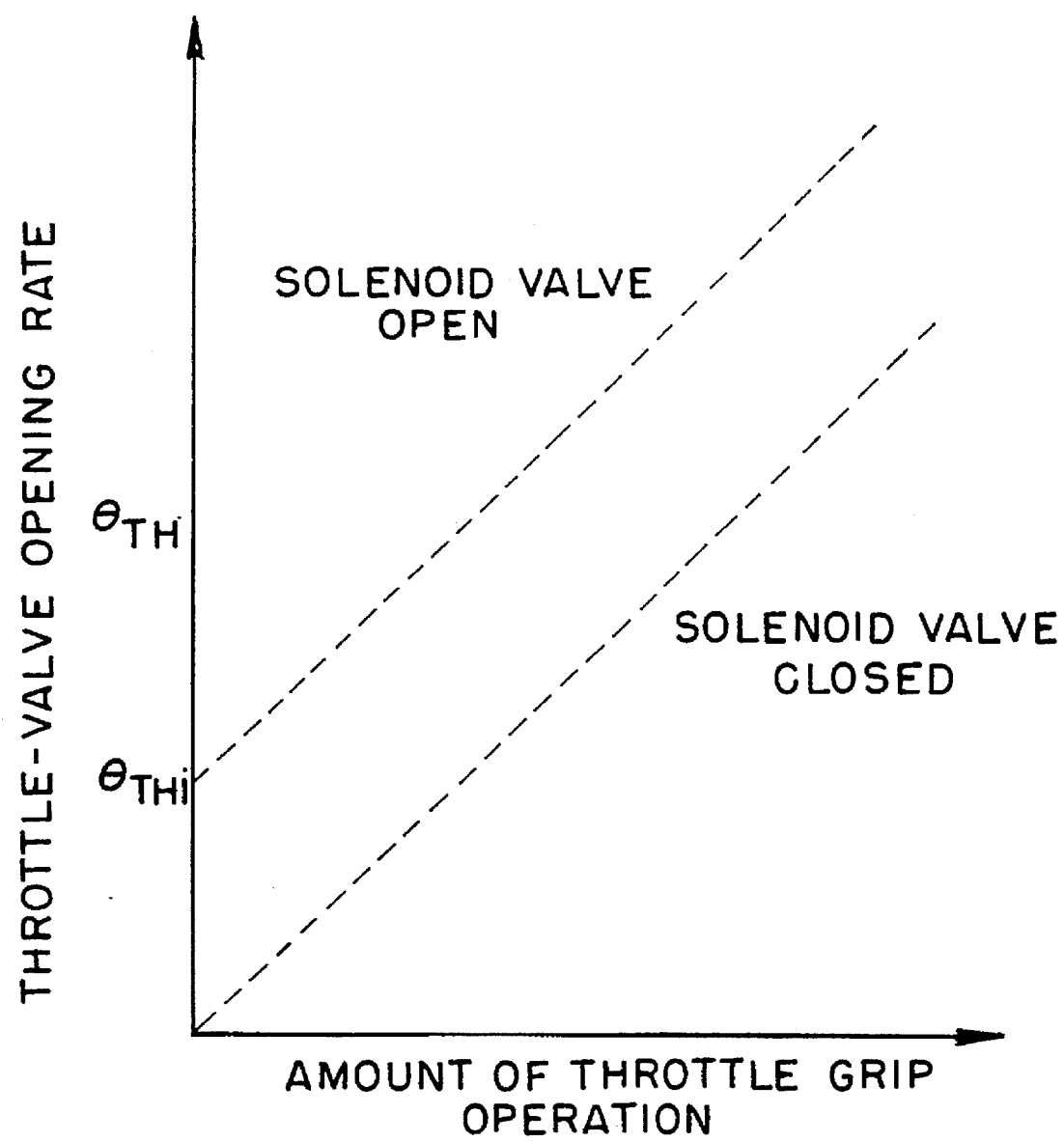
FIG. 13 is a characteristic diagram showing a relation between the amount of throttle grip operation and the throttle-valve opening for the embodiment shown in FIG. 12.

As still another alternative, an idle port 54 can be provided outside a piston-type throttle valve 53 as shown in FIG. 12. The piston-type throttle valve 53 can be closed to a throttle opening rate $\theta_{th}$ smaller than the idle throttle opening rate $\theta_{thi}$. The idle port 54 embeds an independent built-in fuel light-duty discharge nozzle connected in parallel to the piston-type throttle valve 53. The exit of the idle port 54 is opened and closed by using a solenoid valve 55. In the case of such an embodiment, relations between the amount of throttle grip operation and the throttle opening rate $\theta_{th}$ are represented by characteristic curves shown in FIG. 13. Much like the embodiments described earlier, in the region of the AR-combustion operation, the CPU 43 outputs a control signal for closing the solenoid valve 55. When an AR-combustion operation for a light load is being carried out, the idle port 54 can be opened instantaneously by merely operating the solenoid valve 55, allowing a transition from an AR-combustion state to an ordinary-combustion state to take place promptly. As a result, the responsiveness can be enhanced.

In the case of an AR-combustible spark-ignition two-cycle engine of the fuel-jet type, the opening of the exhaust control valve is set at a value based on the engine's rotational speed Ne and the throttle-valve opening rate $\theta_{th}$. In addition, it is also desirable to correct the fuel jet amount by detecting an operational delay of the exhaust control valve.

Figure 14:
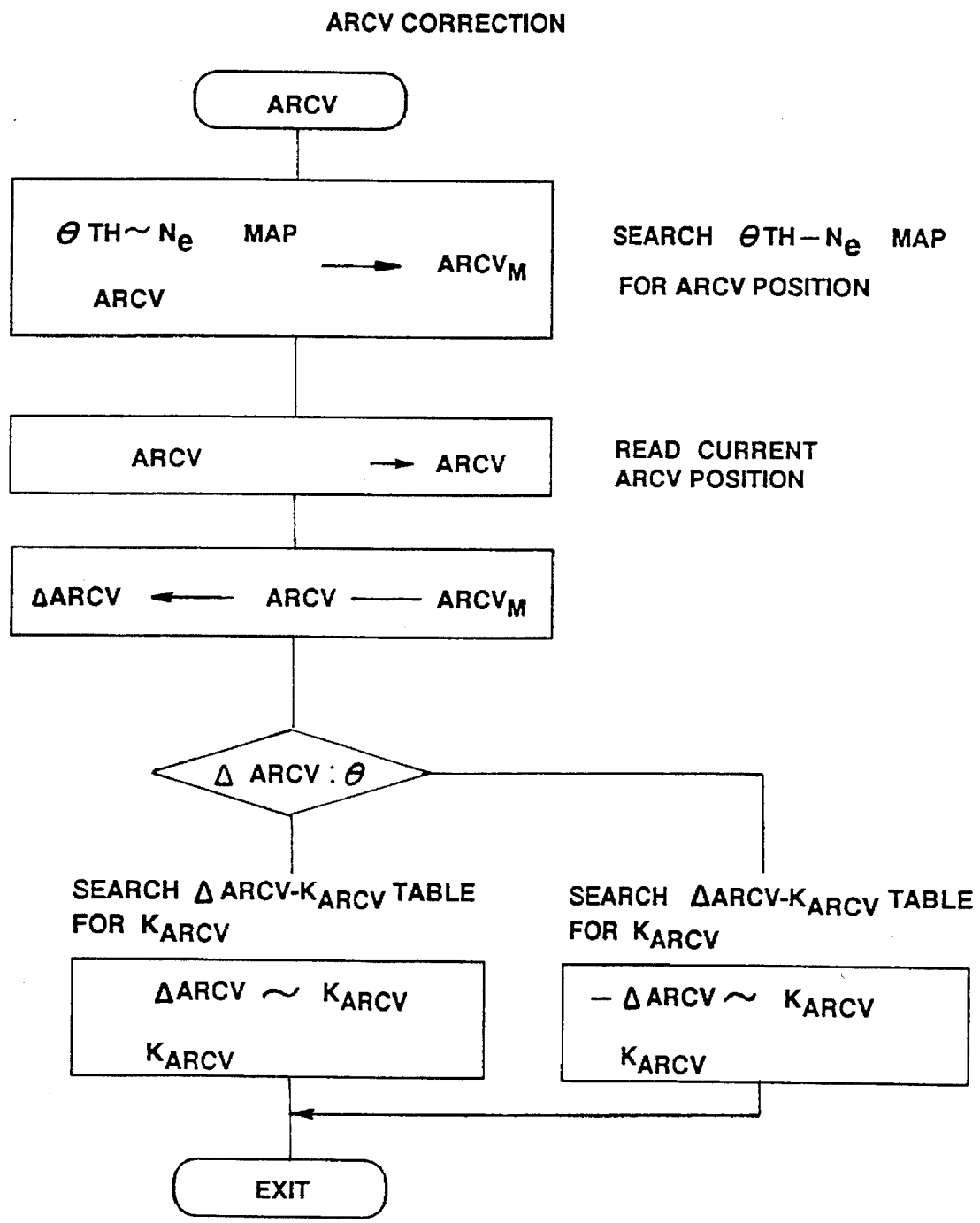
FIG. 14 shows a flowchart illustrating a procedure for finding a correction coefficient from a difference between a derived opening position and an actual opening position of an exhaust control valve employed in still another embodiment provided by the present invention.
Figure 15:
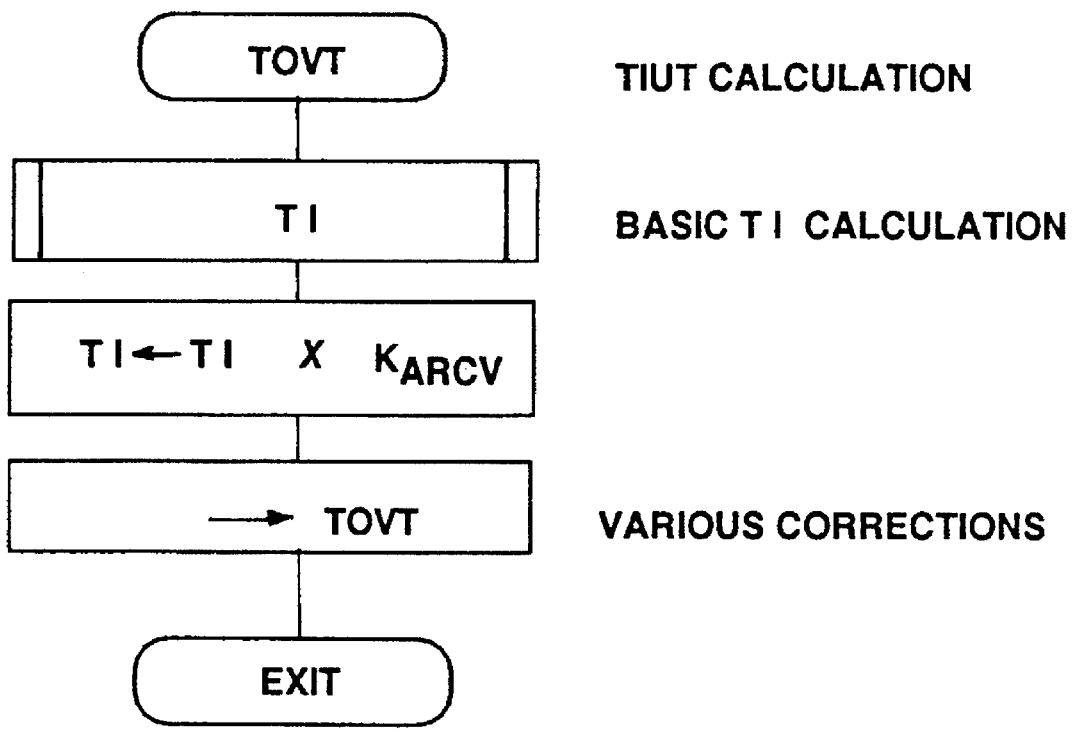
FIG. 15 shows a flowchart showing a procedure for correcting a fuel jet amount in the embodiment of FIG. 14.

The correction of the fuel jet amount is carried out in accordance with flowcharts shown in FIGS. 14 and 15. Reference notation $ARCV_M$ shown in the flowchart of FIG. 14 denotes an opening position of the exhaust control valve found by derivation based on the control map with the throttle opening rate $\theta_{th}$ and the engine rotational speed Ne used as inputs. On the other hand, reference notation ARCV is data obtained by reading an actual opening position of the exhaust control valve.

Reference notation $K_{ARCV}$ denotes a correction coefficient used for compensating for a discrepancy between the opening positions $ARCV_M$ and ARCV of the exhaust control valve. That is to say, a difference between the opening positions $ARCV_M$ and ARCV of the exhaust control valve is found. A positive difference between the opening positions $ARCV_M$ and ARCV of the exhaust control valve is then used for searching a positive correction map for a value of the correction coefficient $K_{ARCV}$ which is used for compensating for a discrepancy between the opening positions $ARCV_M$ and ARCV of the exhaust control valve. Likewise, a negative difference between the opening positions $ARCV_M$ and ARCV of the exhaust control valve is then used for searching a negative correction map for a value of the correction coefficient $K_{ARCV}$ for the discrepancy compensation. Finally, the value of the correction coefficient $K_{ARCV}$ for the discrepancy compensation is multiplied by a basic fuel jet amount $T_i$ found by derivation based on the control map with the throttle opening rate $\theta_{th}$ and the engine rotational speed Ne used as inputs to give a corrected fuel jet amount.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A throttle-valve control apparatus for an AR-combustible spark-ignition two-cycle engine wherein, at least in a region of light-load operations, a compression-start pressure is controlled to let fresh air in a combustion chamber self-ignite at a predetermined ignition time so as to undergo active thermal atmosphere combustion, said throttle-valve control apparatus comprising:

a throttle-valve operation member fixed on an intake passage;

a throttle valve fixed on said intake passage;

a throttle-valve operation member for manually operating said throttle valve;

a by-pass intake passage for by-passing a portion of said air intake passage between upstream and downstream sides of said intake passage around said throttle valve;

an opening/closing valve for opening and closing said by-pass intake passage; and an opening/closing control means for controlling said opening/closing valve by determining whether a current state is a state for operating said AR-combustible spark-ignition two-cycle engine by combustion resulting from spark ignition or a state for operating said AR-combustible spark-ignition two-cycle engine by AR combustion resulting from self-ignition at a controlled ignition time, and either opening said opening/closing valve if said current state is determined to be a state for operating said AR-combustible spark-ignition two-cycle engine by combustion resulting from spark ignition or closing said opening/closing-valve if said current state is determined to be a state for operating said AR-combustible spark-ignition two-cycle engine by AR combustion resulting from self-ignition at a controlled ignition time.

2. The throttle-valve control apparatus according to claim 1, wherein said by-pass intake passage is provided for maintaining a minimum amount of air/fuel intake to maintain said AR-combustible spark-ignition two-cycle engine in an idle state.

3. A throttle-valve control apparatus for an AR-combustible spark-ignition two-cycle engine wherein, at least in a region of light-load operations, a compression-start pressure is controlled in order to let a fresh air/fuel mixture in a combustion chamber self-ignite so as to undergo active thermal atmosphere combustion, said throttle-valve control apparatus comprising:

a throttle valve fixed in an air intake passage;

a throttle-valve operation member for manually operating said throttle valve;

a throttle-valve-closing-direction limiting means for selectively limiting a closing direction of said throttle valve so as to prevent said throttle valve from being closed beyond a predetermined amount; and throttle-valve-opening-limit control means for controlling said throttle-valve-closing-direction limiting means by determining whether a current state is a state for operating said AR-combustible spark-ignition two-cycle engine by combustion resulting from spark ignition or a state for operating said AR-combustible spark-ignition two-cycle engine by AR-combustion resulting from self-ignition at a controlled ignition time, and either actuating said throttle-valve-closing-direction limiting means so as to prevent said throttle valve from being closed beyond the predetermined amount if said current state was determined to be a state for operating said AR-combustible spark-ignition two-cycle engine by combustion resulting from spark ignition or placing said throttle-valve-closing-direction limiting means in a non-operative state so as to allow said throttle valve to be closed more than said predetermined amount if said current state was determined to be a state for operating said AR-combustible spark-ignition two-cycle engine by AR-combustion resulting from self-ignition at a controlled ignition time.

4. The throttle-valve control apparatus according to claim 3, wherein said throttle-valve-closing-direction limiting means includes a protrusion which engages an arm disposed on a throttle drum, wherein when said protrusion is in one rotational position, the throttle drum prevents the throttle valve from closing beyond a predetermined amount, and wherein when said protrusion is in a second rotational position, the throttle drum permits the throttle valve to close beyond said predetermined amount.

5. The throttle-valve control apparatus according to claim 4, wherein said protrusion is rotated by an actuator.

6. The throttle-valve control apparatus according to claim 4, wherein an adjustment screw is provided on an engagement end of said arm.

7. A throttle-valve control apparatus for an AR-combustible spark-ignition two-cycle engine wherein, at least in a region of light-load operations, a compression-start pressure is properly controlled in order to let a fresh air/fuel mixture in a combustion chamber self-ignite so as to undergo active thermal atmosphere combustion, said throttle-valve control apparatus comprising:

a throttle valve fixed in an air intake passage;

a throttle-valve operation member for manually operating said throttle valve;

a throttle-valve opening means for opening said throttle valve in accordance with amounts of manual operation of said throttle-valve operation member; and a throttle-valve-opening control means for driving said throttle-valve opening means by determining whether a current state is a state for operating said AR-combustible spark-ignition two-cycle engine by combustion resulting from spark ignition or a state for operating said AR-combustible spark-ignition two-cycle engine by AR-combustion resulting from self-ignition at a controlled ignition time, and setting a lower-limit value of the opening of said throttle valve resulting from manual operations of said throttle-valve operation member small in comparison with a lower-limit value of those in a state for operating said AR-combustible spark-ignition two-cycle engine by ordinary combustion resulting from spark ignition if said current state was determined to be a state for operating said AR-combustible spark-ignition two-cycle engine by AR combustion resulting from self-ignition at a controlled ignition time.

8. The throttle-valve control apparatus according to claim 7, wherein said throttle-valve-opening control means includes a cam which engages said throttle-valve opening means, wherein when said cam is in one rotational position the throttle-valve opening means is prevented from allowing the throttle valve from closing beyond a predetermined amount, and wherein when said cam is in a second rotational position the throttle-valve opening means allows the throttle valve to close beyond said predetermined amount.

9. The throttle-valve control apparatus according to claim 8, wherein said cam is rotated by an actuator.

10. The throttle-valve control apparatus according to claim 8, wherein said throttle-valve opening means includes a throttle drum and an arm disposed on said drum which engages said cam.

11. The throttle-valve control apparatus according to claim 10, wherein an adjustment screw is provided on an engagement end of said arm.

12. The throttle-valve control apparatus according to claim 7, wherein said throttle-valve opening control means includes a protrusion which engages said throttle-valve opening means, wherein when said protrusion is in one rotational position, the throttle-valve opening means is prevented from allowing the throttle valve from closing beyond a predetermined amount, and wherein when said protrusion is in a second rotational position the throttle-valve opening means allows the throttle valve to close beyond said predetermined amount.

13. The throttle-valve control apparatus according to claim 12, wherein said protrusion is rotated by an actuator.

14. The throttle-valve control apparatus according to claim 12, wherein said throttle-valve opening means includes a throttle drum and an arm disposed on said drum which engages said protrusion.

15. The throttle-valve control apparatus according to claim 14, wherein an adjustment screw is provided on an engagement end of said arm.

* * * * *